United States Patent [19]

Holloway et al.

[11] 4,261,954
[45] Apr. 14, 1981

[54] COKER BLOW DOWN RECOVERY SYSTEM

[75] Inventors: Richard L. Holloway, Bellingham, Wash.; John A. Miller, Seabrook, Tex.; Jerald E. Winters, El Toro, Calif.

[73] Assignee: Atlantic Richfield Company, Philadelphia, Pa.

[21] Appl. No.: 43,940

[22] Filed: May 30, 1979

[51] Int. Cl.³ .............................................. B01D 3/14
[52] U.S. Cl. ...................................... 422/187; 196/99; 196/122; 196/126; 202/241
[58] Field of Search .......................... 201/17; 422/187; 208/48 R; 134/10, 12; 202/241; 196/98, 99, 122, 123, 126, 127; 203/97, 98

[56] References Cited

U.S. PATENT DOCUMENTS

| 1,927,059 | 9/1933 | Bahlke | 208/48 R X |
|---|---|---|---|
| 1,976,507 | 10/1934 | McAfee | 208/48 R X |
| 1,978,593 | 10/1934 | Nelson | 208/48 R X |
| 2,108,649 | 2/1938 | Calderwood | 208/48 R X |
| 2,343,848 | 3/1944 | Barron | 208/48 R X |
| 2,911,355 | 11/1959 | Ernst, Jr. | 208/48 R X |
| 3,146,185 | 8/1964 | Fella | 208/48 R |
| 3,215,618 | 11/1965 | Watkins | 208/48 R X |
| 3,759,673 | 9/1973 | Whitten et al. | 201/17 X |

FOREIGN PATENT DOCUMENTS

| 559863 | 7/1958 | Canada | 208/48 R |
|---|---|---|---|
| 630637 | 11/1961 | Canada | 208/48 R |

Primary Examiner—Richard L. Chiesa
Attorney, Agent, or Firm—Stanley M. Welsh

[57] ABSTRACT

A coker blow down recovery system for recovering additional useful fuel components such as $C_1$—$C_7$ hydrocarbons from a coker vessel is disclosed. A significant reduction in sulfur components contained in coker blow down gases, e.g. flare gases, is also achieved.

3 Claims, 2 Drawing Figures

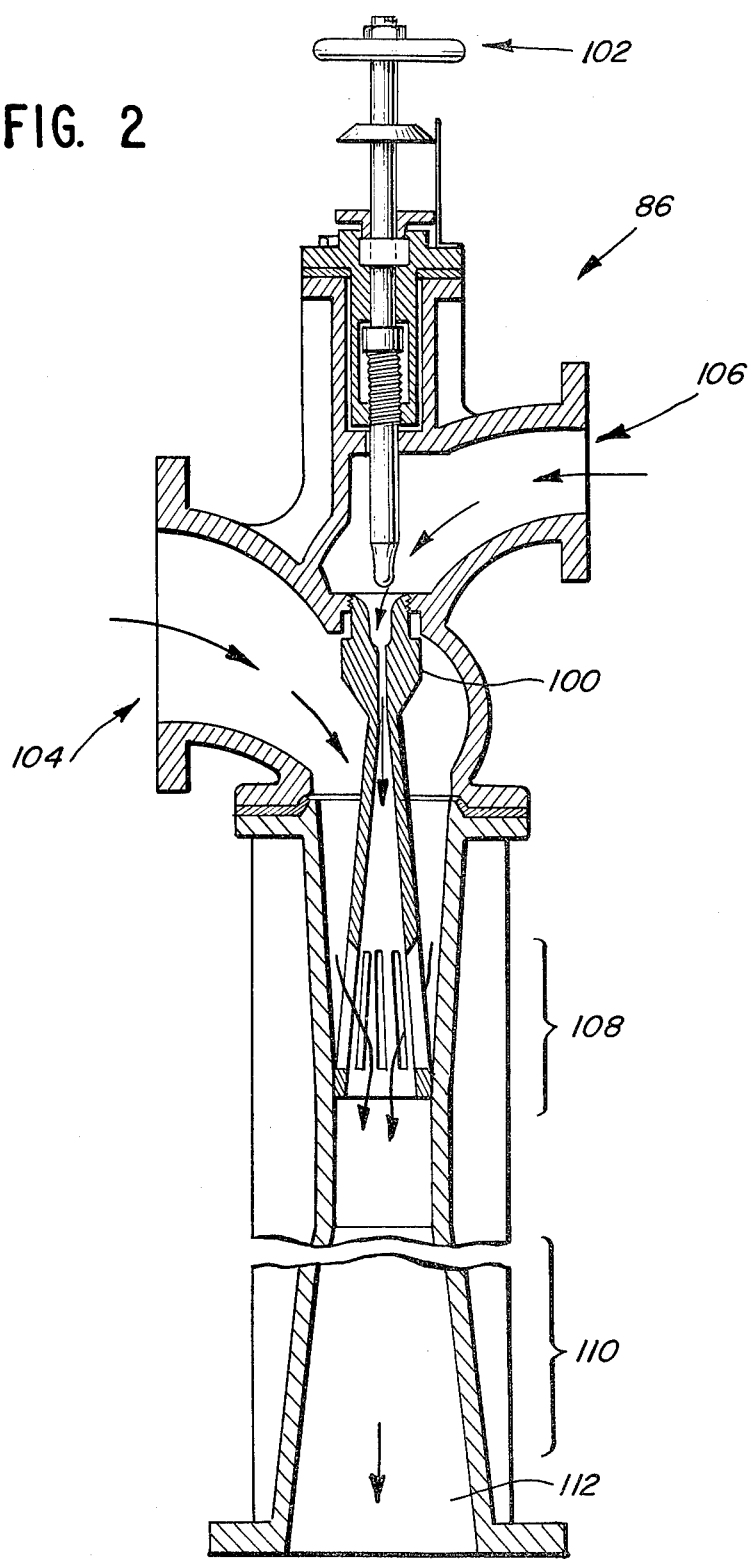

COKER BLOW DOWN RECOVERY SYSTEM

BACKGROUND OF THE INVENTION

1. Field of the Invention

The field of this invention relates to apparatus and processes for producing petroleum coke. More particularly, this invention relates to the recovery of $C_1$—$C_7$ hydrocarbon components present in coker blow down gases.

2. Prior Art

Petroleum coke is produced by heating hydrocarbon residues having boiling points generally above about 750° F. Coker vessels are employed which contain the heated hydrocarbons at temperatures in the range of about 750° F. to about 850° F. Temperatures of at least about 750° F. are required in order to produce any significant amount of coke from petroleum hydrocarbons. The rate of coke formation generally increases with temperature.

During coke formation some of the petroleum residues break down into lower molecular weight hydrocarbons. Some of these lower molecular weight hydrocarbons are recovered and become part of a liquid product produced.

When the coke vessel has filled to a desired amount with coke, a cleaning process to remove the coke deposits is initiated. This includes first discontinuing a flow of residuum hydrocarbon to the coker vessel and then employing a stripping stream, e.g. stream, to remove any hydrocarbons which have not been converted to coke from the vessel. Most of the hydrocarbons stripped by this stream is taken to a fractionator or distillation column. However, at some point the stripping stream and stripped hydrocarbons are transferred to a coker blow down system instead of the fractionator column. The point in time for changing from the fractionator to the coker blow down system is somewhat arbitrary and depends upon the cost of fractionating water and hydrocarbon in the column versus discarding the hydrocarbon which would otherwise be recovered.

Conventionally, the typical blow down recovery system contains a condenser and a knock-out pot, e.g. an accumulator-separator, and conduits to a flare. Noncondensable gases, often referred to as flare gases, which are separated in the knock-out pot, comprise the nonliquefiable portion of the materials taken from the coker vessel during clean up. Conventionally, the nonliquefiable portion so separated is vented to a flare and burned in the air.

The costs for recovering useful components from such flare gases are usually prohibitive. Efforts to find ways of economically recovering useful fuel gas, comprising predominately $C_1$-$C_4$ hydrocarbons, from flare gases has not been successful because of the prohibitive capital costs required by currently known and practiced methods. Also, the large variation in both the quantity and pressure of flare gases over the cycle for producing coke makes it very difficult to recover these gases. Also of some importance is the sulfur content of presently burned flare gases. The greater the sulfur content, the more undesirable environmentally is the burning of such flare gases. Though the pollution contribution from burning high sulfur content flare gases is small, the cumulative effect of it plus other refinery operations can in environmentally sensitive areas require costly retrofitting to lessen sulfur oxide emissions.

It is an object of this invention to provide a cost effective method or process for recovering useful fuel components from flare gases.

It is an object of this invention to lower the sulfur content of flare gases.

Other objects of this invention are clear to one of skill in the art based upon the teachings of this specification.

BRIEF DESCRIPTION OF THE INVENTION

The above objects have been found to be achievable by an improved process and apparatus of this invention. Broadly, the apparatus of this invention is an improvement to a coker system, which provides a particularly effective way both for lowering the sulfur content of flare gases and for recovering $C_1$—$C_7$ from such flare gases. The coker system comprises a coker means, a fractionator means, a compressor means and at least two means for accumulating and separating, comprising a first means and a second means. The first means can correspond to the knock-out pot and condensor or just the knock-out pot of a typical coker blow down system. The second means can correspond to a condensor and separator-accumulator which is immediately down stream from the fractionator. The improvement to the coker system comprises adding a pressurizing means for raising the pressure of a first stream by mixing said first stream with a second stream. The pressurizing means comprises a first inlet, a second inlet, and at least one outlet. The first inlet is connected to said first means so as to introduce into said first inlet nonliquefiable material separated in said first means. The second inlet is connected so as to introduce at least a portion of material down stream from said compressor means into said second inlet. The outlet is connected to said second means so as to transfer a mixture comprising the inputs from both said first and second inlets. The advantage of this arrangement is at least two fold. First, additional useful hydrocarbon components are separated from gases which would otherwise be transferred to a flare. And second, the sulfur content of the flare gas is significantly reduced.

More narrowly, the first stream from the first means or knock-out pot comprises volatile or nonliquefiable components such as hydrogen gas, hydrogen sulfide, and hydrocarbons. These hydrocarbons can contain up to seven carbon atoms. Hydrocarbons containing x carbon atoms are herein referred to as $C_x$. More generally, the hydrocarbons of flare gases contain up to a maximum of $C_5$ hydrocarbons. The second stream comprises materials which are nonliquefiable at a temperature in the range of about 80° F. to about 150° F. when at a pressure in the range of about 50 psig to about 200 psig.

The apparatus of this invention can comprise a coker means, a fractionator means, a heater means, a compressor means, at least three means for accumulating and separating which comprise a first means, a second means, and a third means, and a pressurizing means for raising the pressure of a first stream by mixing said first stream with a second stream. The inlets and outlets for each of the above listed pieces of equipment are as follows: the fractionator means has at least two inlets which will be hereinafter referred to as a first fractionator-inlet and a second fractionator-inlet and has at least three outlets which are hereinafter referred to as a first fractionator-outlet, a second fractionator-outlet, and a third fractionator-outlet. The heater means has at least one heater-outlet and at least one heater-inlet. The coker means has at least one coker-inlet and at least one coker-outlet. The compressor means has at least one compressor-inlet and at least one compressor-outlet. The first means has at least one first-means-inlet and at least one first-means-outlet. The second means has at least one second-means-inlet and at least one second-means-outlet. The third means has at least one third-means-inlet and at least one third-means-outlet. The pressurizing means has at least two inlets which are hereinafter referred to as the first pressurizing-means-inlet and a second pressurizing-means-inlet and has at least one pressurizing-means-outlet.

The above -described apparatus with its corresponding inlets and outlets is connected together in the following way. The first fractionator-inlet is adapted to be connected to a source of hydrocarbon feedstocks. The second fractionator-inlet is connected to the coker-outlet so that hydrocarbon which are broken down into volatile components during the conversion of residuum hydrocarbons into coke can be transferred either as vapors alone or with a stripping stream from said coker-outlet to said second fractionator-inlet. The first fractionator-outlet is connected to the heater-inlet so as to be able to transfer a residuum stream of hydrocarbon from said fractionator to the heater-inlet. The second fractionator-outlet is connected to the second-means-inlet, so as to be able to transfer volatile hydrocarbons from the fractionator to the second means. The third fractionator-outlet is connected to a zone for liquid products. The heater-outlet is connected to the coker-inlet so as to transfer heated residuum hydrocarbon streams into said coker means. The first-means-outlet is connected to the first pressurizing-means-inlet so as to be able to transfer nonliquefiable hydrocarbons separated in the first means from said first means to the first pressurizing-means-inlet. The pressurizing-means-outlet is connected to the second-means-inlet so as to transfer a pressurized stream from the pressurizing means to the second means. The second-means-outlet is connected to the compressor-inlet, so as to transfer volatile components separated in the second means to the compressor means. Optionally, an additional second-means-outlet is connected to the zone for liquid products so that liquefiable components separated in the second means can be transferred to that zone. The compressor-outlet is connected to both the third-means-inlet and the second pressurizing-means-inlet so that at least a portion of the material down stream from the pressurizing means can be transferred to the second pressurizing-means-inlet and at least a portion of the remainder of the material transferred to the third-means-inlet. At least one of the third-means-outlets is adapted to be connected to a fuel storage zone.

The method of this invention is broadly a process for recovering nonliquefiable components separated from a coker means during clean up of the coker means. The process comprises stripping hydrocarbons with a stripping stream such as for example, steam, from freshly produced coke deposits present in the coker means. The stripping stream and the hydrocarbons stripped thereby together form a mixture. The mixture is cooled and separated into volatile and nonvolatile components. The volatile components are mixed with a second stream which is at a higher pressure than the volatile components to produce a first pressurized stream which is separated into liquefiable and nonliquefiable components. The nonliquefiable components separated from the first pressurized stream are further pressurized to form a second pressurized stream. The second pressurized stream is separated into liquefiable and nonliquefiable components. At least two benefits are achieved by this process which are that additional desirable fuel components including $C_5$ hydrocarbons can be recovered and the sulfur content of flare gases is substantially lessened.

BRIEF DESCRIPTION OF THE FIGURES

FIG. 2 is an enlarged cross-sectional view of an injector or pressurizing means for raising the pressure of one stream by mixing it with a second stream which is at a higher pressure.

DETAILED DESCRIPTION OF THE INVENTION

Figure 1:
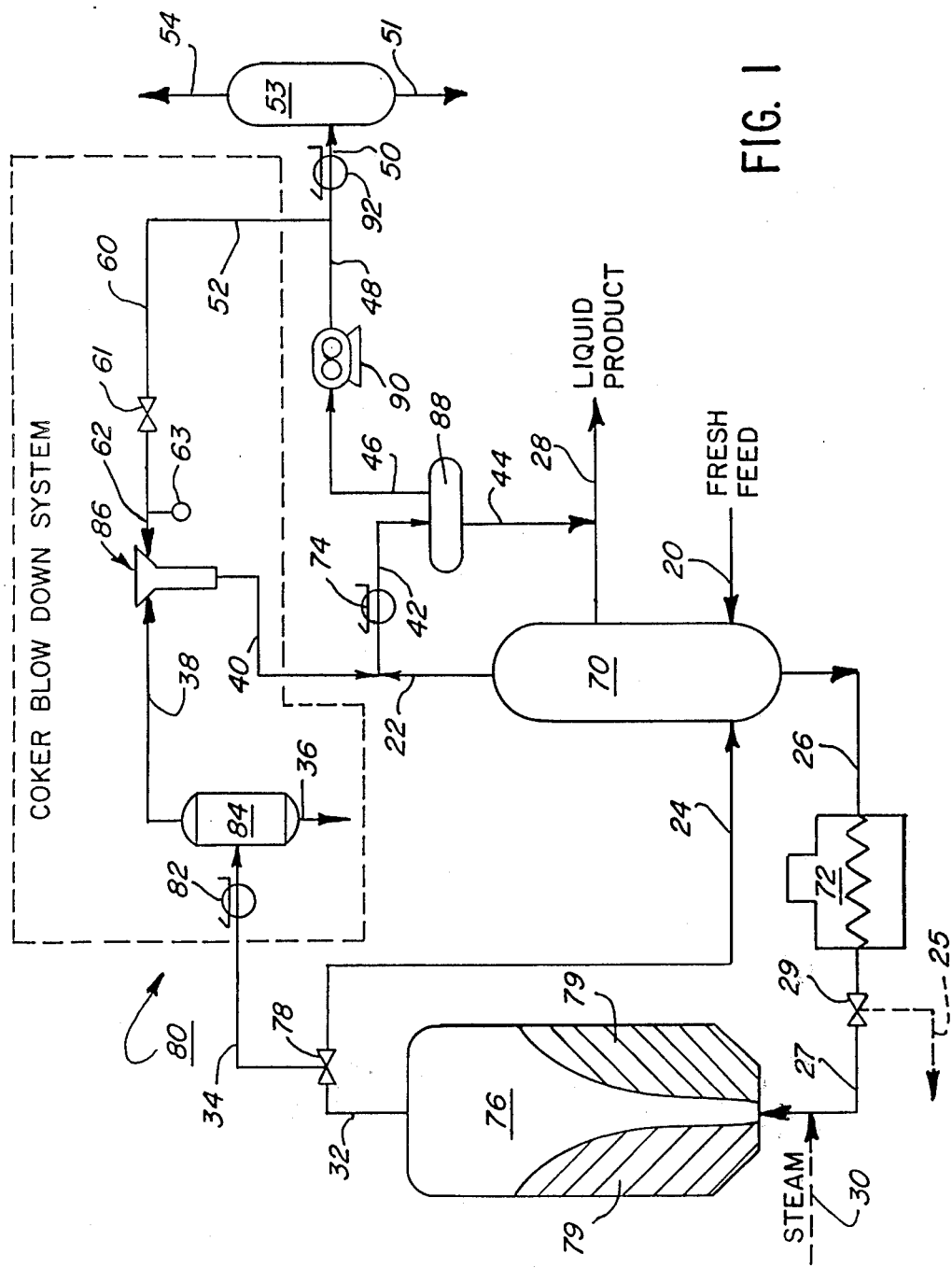
FIG. 1 is a schematic view of the process equipment involved in the formation of petroleum coke.

FIG. 1 comprises valves 29, 61 and 78, conduits 20, 22, 24, 25, 26, 27, 28, 30, 32, 34, 36, 38, 40, 42, 44, 46, 48, 50, 51, 52, 54, 60, and 62, a high pressure separator or vessel 53, a fractionator or distillation column 70, a heater 72, a coker 76, condensers 74, 82 and 92, a knock-out pot or vessel 84, a jet compressor 86, accumulator-separator 88 and a compressor 90.

A hydrocarbon feedstock such as a residuum having an initial boiling point of about 750° F. and higher is introduced via conduit 20 into a fractionator 70 at a rate in the range of about 20 to about 20,000 barrels per hour. Exiting from fractionator 70 via conduit 26 is a first stream, a residuum stream which has a boiling point above about 750° F. The maximum boiling point of some portions or components of the residuum stream can be as high as 1300° F. The residuum stream is at a temperature in the range of about 300° F. to about 790° F. and is further heated to a temperature in the range of about 900° F. to about 950° F. on transfer through heater 72.

Exiting from fractionator 70 via conduit 28 is a second stream, a liquid product stream, having a boiling point in the range of about 100° F. to about 900° F. The liquid product stream contains $C_5$ hydrocarbons up to hydrocarbons having boiling points of about 900° F. such as naphtha, stove oil, gas oil and the like.

Exiting from fractionator 70 via conduit 22 at a temperature in the range of about 200° F. to about 300° F. is a third stream, a volatile components stream having a boiling point in the range of −240° F. (boiling point of methane) to about 390° F. The volatile components stream is cooled upon transfer through an over-head condenser 74 to a temperature in the range of about 80° F. to about 150° F.

The heated residuum stream is transferred via conduit 27 past valve 29 within conduit 27 to coker 76. Coker 76 is maintained at a temperature at the outlet to conduit 32 in the range of about 750° F. to about 850° F. and preferably in the range of about 800° F. to about 820° F. The flow of the heated residuum stream in coker 76 is maintained at a rate to permit both coking and thermo-cracking of the hydrocarbons in the residuum stream. The hydrocarbons breakdown into volatile components having a boiling point in the range of methane to about 900° F. Such hydrocarbons are transferred by conduit 32 through valve 78 to conduit 24 and then into fractionator 70.

The process of introducing the heated residuum stream into coker 76 is continued until coker 76 is filled to a desired capacity with coke deposits 79. The time required to fill coker 76 is in the range of about 18 hours to about 30 hours and varies depending upon both the capacity of coker 76, composition of the residuum stream and process conditions under which coker 76 is run.

When a desired amount of coke 79 has been formed in coker 76, valve 29 is closed the heated residuum stream can be diverted to a second coker via conduit 25, while coker 76 is being cleaned, as hereinafter described.

Shortly after conduit 27 to coker 76 is closed, e.g. within above five minutes, a process involving introducing a stripping steam, e.g. steam at a temperature that gives rise to a pressure thereof of about 140 psig, and at a rate in the range of about 5 to 15,000 pounds per hour via conduit 30 into coker 76 is initiated. This process of introducing a stripping stream with valve 78 open to conduit 24 and fractionator 70 is continued depending upon the amount of coke present for about 10 to about 30 minutes. Then, with the process continuing, valve 78 is turned closing 24 to fractionator 70 but opening conduit 34 to a coker blow down system 80. The material which passes from coker 76 through valve 78 into conduit 34 comprises hydrogen gas, hydrogen sulfide, water, $C_1$—$C_5$ hydrocarbons and occasionally, though undesirably, $C_7$ hydrocarbons. This material initially at a temperature in the range of about 600° F. to about 800° F. and at a pressure in the range of about 30 psig to about 80 psig is cooled to a temperature in the range of about 50° F. to about 150° F. and changes to a pressure of about one psig to about five psig on passage through condenser 82 into vessel 84. Waste sour water and other condensables are removed from vessel 84 via conduit 36. The waste sour water is then treated as environmentally required and discarded or recycled.

The nonliquefiable components from vessel 84 are transferred at a temperature in the range of about 50° F. to about 150° F. and at a pressure in the range of about 0 psig to five psig via conduit 38 to the low pressure inlet of jet compressor 86. The pressure at the low pressure inlet is in the range of about 0 psig to about 10 psig. The input to jet compressor 86 from the high pressure side via conduit 62 is at a pressure in the range of about 50 psig to about 200 psig and preferably about 100 psig to about 125 psig.

Exiting from vessel 88 via conduit 44 is a liquefiable able hydrocarbon stream which contains $C_5$ hydrocarbons up to hydrocarbons having boiling points of about 390° F. This stream is added to the liquid product stream carried via conduit 28. Exiting from vessel 88 via conduit 46 is a nonliquefiable hydrocarbon stream having a pressure in the range of about 15 psig to about 40 psig and preferably about 25 to about 35 psig and a temperature in the range of about 80° F. to about 150° F. and preferably about 100° F. to about 120° F. The nonliquefiable hydrocarbon stream after passing through compressor 90 is at a pressure in the range of about 100 psig to about 300 psig and preferably about 100 psig to about 200 psig, and a temperature in the range of about 200° F. to about 400° F. and preferably about 250° F. to about 350° F. A portion of this nonliquefiable stream is recycled via conduits 52 and 60 through valve 61 and into conduit 62 leading to the high pressure inlet side of jet compressor 86. A pressure regulator 63 in conduit 62 regulates the pressure to the high pressure inlet of jet compressor 86 to a value in the range of about 50 to about 200 psig and preferably in the range of about 100 psig to about 120 psig. The remainder of the nonliquefiable hydrocarbon stream within conduit 48 is transferred through condenser 92. This stream after being cooled by condenser 92 is at a temperature in the range of about 80° F. to about 120° F. and preferably about 100° F. to about 110° F. and at a pressure in the range of about 45 psig to about 190 psig and preferably about 100 psig to about 110 psig.

The hydrocarbon stream exiting from condenser 92 via conduit 50 is introduced into vessel 53. Two streams exit from vessel 53. A liquefiable stream exits via conduit 51 and comprises $C_5$ to $C_7$ hydrocarbons. The second stream exits via conduit 54 and comprises hydrogen, hydrogen sulfide, and $C_1$ to $C_5$ hydrocarbons which are burned for their fuel value.

FIG. 2 discloses a jet compressor 86 comprising a nozzle 100, a nozzle adjustment means 102, a low pressure inlet 104, a high pressure inlet 106, a mixing section 108, and a defuser section 110 and a discharge outlet 112. Other apparatus for raising the pressure of one stream upon mixing with a second stream are readily apparent to one skilled in the art and are broadly considered equivalent to jet compressor 86 and are considered part of this invention.

In more detail jet compressor or injector 86 operates as follows. A driving or motive stream enters high pressure inlet 106 at a pressure in the range of about 50 psig to about 200 psig and preferably at a pressure in the range of about 100 psig to about 110 psig in the direction shown by arrows. This motive stream enters nozzle 100 through an opening which can be varied in size by nozzle adjustment means 102. This driving stream draws in a second stream through low pressure inlet 104 in the direction shown by the arrows. The inlet pressure at the low pressure inlet 104 of jet compressor 86 is at a pressure in the range of about 0 psig to about 10 psig. The streams from both the low and high pressure inlets 104 and 106, respectively, are mixed in region 108. This combined stream has a pressure in the range of about 5 psig to about 100 psig and preferably in the range of about 10 psig to about 30 psig and a temperature in the range of about 200° F. to about 300° F. and preferably in the range of about 240° F. to about 270° F. The combined stream exits jet compressor 86 in the direction shown by the arrows through outlet 112.

The relationships between inlet and outlet pressures are very important to this invention. Jet compressor 86 is particularly suited to performing the process of mixing required in this invention.

Variations on the specific embodiments of this invention are readily apparent to a man who is skilled in the art based on this disclosure. Such variations are intended to be part of this invention.

The invention which is claimed:

1. In a coker system comprising a coker means, a fractionator means, a compressor means, and at least two means for accumulating and separating, which comprise a first means having at least one first-means-inlet and one first-means-outlet and a second means having at least one second-means-inlet and one second-means-outlet, said coker means having at least one coker-means-inlet and one coker-means-outlet, said fractionator means having at least one fractionator-means-outlet, said compressor means having at least one compressor-means-inlet and one compressor-means-outlet, said coker-means-inlet being connected to said fractionator-means-outlet, said coker-means-outlet being connected to said first-means inlet, said compressor-means-inlet being connected to said second-means-outlet, wherein the improvement comprises a pressurizing means for raising the pressure of a first stream by mixing said first stream with a second stream, wherein said pressurizing means comprises a first pressurizing-means-inlet, a second pressurizing-means-inlet, and at least one pressurizing-means-outlet, said first pressurizing-means-inlet being connected to said first-means-outlet so as to introduce into said first pressurizing-means-inlet said first stream comprising nonliquefiable material separated in said first means, said second pressurizing-means-inlet being connected so as to introduce said second stream comprising at least a portion of material downstream from said compressor means-outlet into said second pressurizing-means-inlet, and said pressurizing-means-outlet being connected to said second-means-inlet so as to transfer a mixture of inputs of said first and said second inlets into said second means; whereby at least a portion of nonliquefiable components separated in said first means can be recovered.

2. The improvement of claim 1, wherein said first stream comprises materials selected from the group consisting of hydrogen gas, hydrogen sulfide, and hydrocarbons containing up to five carbon atoms and said second stream comprises materials nonliquefiable at a temperature in the range about 80° F. to about 150° F. and at a pressure in the range of about 50 to about 200 psig.

3. A coker system comprising a coker means, a fractionator means, a heater means, a compressor means, at least three means for accumulating and separating, said at least three means for accumulating and separating comprising a first means, a second means and a third means, and a pressurizing means for raising the pressure of a first stream by mixing said first stream with a second stream, wherein said fractionator means has at least two inlets, comprising a first fractionator-inlet, and a second fractionator-inlet, and has at least three outlets, comprising a first fractionator-outlet, a second fractionator-outlet and a third fractionator-outlet, wherein said heater means has at least one heater-inlet and at least one heater-outlet, wherein said coker means has at least one coker-inlet and at least one coker-outlet, wherein said compressor means has at least one compressor-inlet and at least one compressor-outlet, wherein said first means has at least one first-means-inlet and at least one first-means-outlet, wherein said second means has at least one second-means-inlet and at least one second-means-outlet, wherein said third means has at least one third-means-inlet and at least one third-means-outlet, and wherein said pressurizing means has at least two inlets, comprising a first pressurizing-means-inlet for said first stream and a second pressurizing-means-inlet for said second stream, and has at least one pressurizing-means-outlet; wherein said first fractionator-inlet is adapted to be connected to a source of feedstock, and said second fractionator-inlet is connected to said coker-outlet, said first fractionator-outlet is connected to said heater-inlet, said second fractionator-outlet is connected to said second-means-inlet, and said third fractionator-outlet is connected to a zone for liquid products, said heater-outlet is connected to said coker-inlet, said first-means-inlet is connected to said coker-outlet, and said first-means-outlet is connected to said first pressurizing-means-inlet, said pressurizing-means-outlet is connected to said second-means-inlet, said second-means-outlet is connected to said compressor-inlet, said compressor-outlet is connected to both said third-means-inlet and said second pressurizing-means-inlet, and said third-means-outlet is adapted to be connected to a fuel zone.

* * * * *